US006219017B1

United States Patent
Shimada et al.

(10) Patent No.: US 6,219,017 B1
(45) Date of Patent: Apr. 17, 2001

(54) IMAGE DISPLAY CONTROL IN SYNCHRONIZATION WITH OPTICAL AXIS WOBBLING WITH VIDEO SIGNAL CORRECTION USED TO MITIGATE DEGRADATION IN RESOLUTION DUE TO RESPONSE PERFORMANCE

(75) Inventors: Naoto Shimada, Hachioji; Seiichiro Tabata, Hino; Yukihiro Sugimoto, Tokyo, all of (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/271,368

(22) Filed: Mar. 18, 1999

(30) Foreign Application Priority Data

Mar. 23, 1998 (JP) .................................. 10-092211

(51) Int. Cl.[7] .............................. G09G 3/36; G02F 1/00; G02F 1/13; G02B 27/28
(52) U.S. Cl. ......................... 345/88; 345/132; 345/204; 359/495
(58) Field of Search .................................. 359/279, 494, 359/495, 497, 196, 209; 349/196, 197, 200, 201, 207, 74, 75, 76, 117; 348/42, 54, 56, 57, 59, 767, 762; 345/30, 31, 32, 87, 112, 113, 121, 126, 132, 149, 88, 428, 204

(56) References Cited

U.S. PATENT DOCUMENTS

| | | | |
|---|---|---|---|
| 5,537,256 | 7/1996 | Fergason | 359/495 |
| 5,572,341 | 11/1996 | Fergason | 349/200 |
| 5,689,283 * | 11/1997 | Shirochi | 345/132 |
| 5,715,029 * | 2/1998 | Fergason | 349/196 |
| 5,727,860 * | 3/1998 | Broer et al. | 359/495 |
| 5,801,798 * | 9/1998 | Chen et al. | 349/74 |
| 5,842,762 * | 12/1998 | Clarke | 348/767 |
| 5,897,191 * | 4/1999 | Clarke | 348/767 |
| 5,971,546 * | 10/1999 | Park | 353/38 |
| 6,061,103 * | 5/2000 | Okamura et al. | 348/767 |
| 6,069,649 * | 5/2000 | Hattori | 348/42 |
| 6,069,650 * | 5/2000 | Battersby | 348/59 |

* cited by examiner

*Primary Examiner*—Steven Saras
*Assistant Examiner*—Paul A. Bell
(74) *Attorney, Agent, or Firm*—Armstrong, Westerman, Hattori, McLeland & Naughton, LLP

(57) ABSTRACT

Provided herein is an image display apparatus for displaying high resolution images by shifting pixels based on wobbling operation by placing a TN cell consisting of a polarization changing liquid crystal plate and a birefringence plate on the front side of an LCD to be driven by video signals, the image display apparatus being provided with a correction circuit to which video signal of the preceding filed stored to a field memory, video signal of the current field and a field discriminant signal are inputted, the LCD being driven by correction video signals generated at the correction circuit so as to display a high resolution image mitigating degradation in image quality due to response delays of the LCD and TN cell.

10 Claims, 16 Drawing Sheets

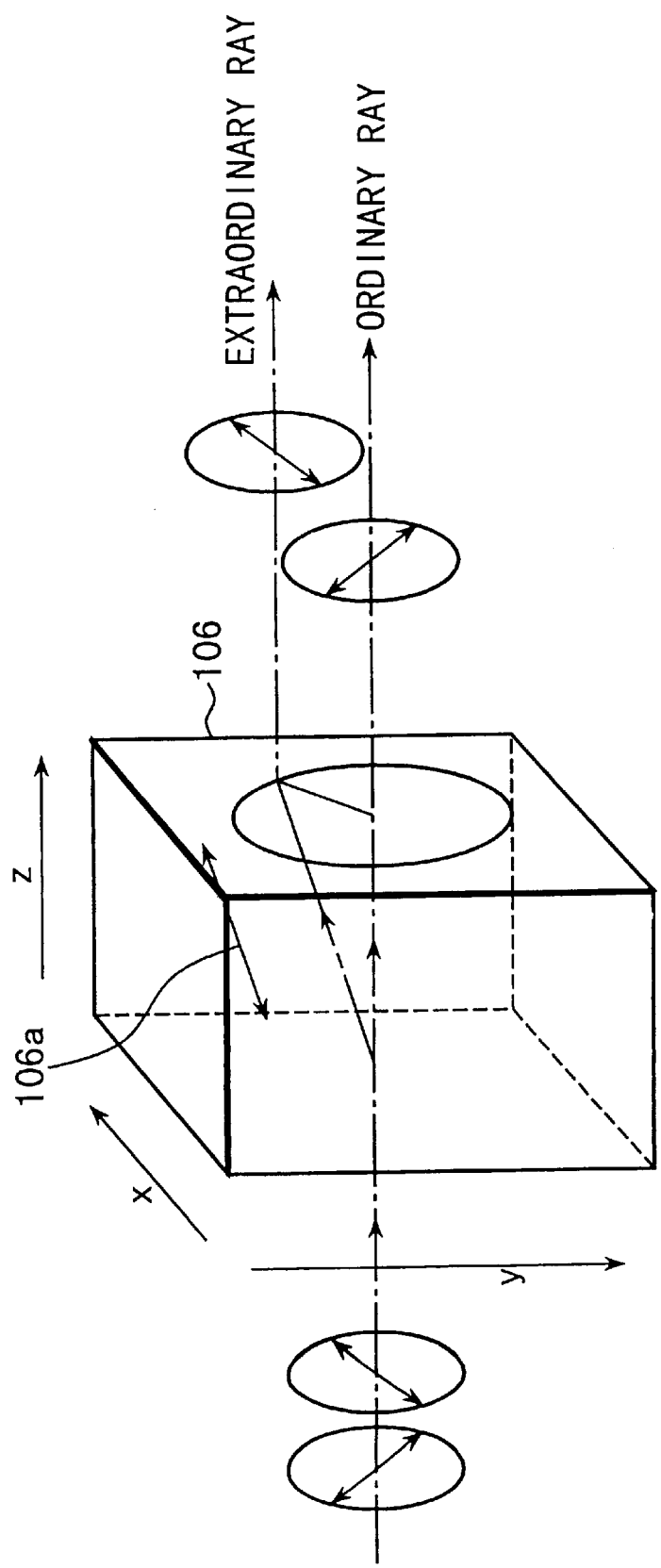

IMAGE DISPLAY CONTROL IN SYNCHRONIZATION WITH OPTICAL AXIS WOBBLING WITH VIDEO SIGNAL CORRECTION USED TO MITIGATE DEGRADATION IN RESOLUTION DUE TO RESPONSE PERFORMANCE

BACKGROUND OF THE INVENTION

The present invention relates to image display apparatus in which a high resolution image is displayed by shifting pixels by means of optical wobbling operation.

Among image display apparatus using a liquid crystal display device or the like, an image display apparatus has been disclosed for example in Japanese patent application laid open No. 7-7704 in which resolution of the liquid crystal display device is improved by effecting a pixel shifting operation called wobbling where the optical axis of light from the liquid crystal display device is wobbled in predetermined directions.

A description will now be given with respect to the general construction of an image display apparatus in which resolution is improved by such optical wobbling operation. As shown in FIG. 1, a back light 102 for emitting white light is placed on the back side of a color liquid crystal display device 101, and a wobbling device 103 for wobbling in predetermined directions the optical axis of light from the color liquid crystal device 101 is placed on the front side of the color liquid crystal display device 101. Here, odd field images and even field images of input video signal are displayed on the color liquid crystal display device 101 at the same pixels thereof through an image display control circuit 104. In accordance with their display timing, the optical axis of light from the color liquid crystal display device 101 is wobbled in predetermined directions by the wobbling device 103.

The wobbling device 103 includes a polarization changing liquid crystal plate 105 and a birefringence plate 106 which is placed on the front side thereof. Here, ON/OFF of voltage across the polarization changing liquid crystal plate 105 is controlled by a wobbling liquid crystal drive circuit 107 based on synchronizing signal of the video signal to be displayed on the color liquid crystal display device 101. The light from the color liquid crystal display device 101 is thereby transmitted without changing its polarization when the voltage is ON, while, when the voltage is OFF, the light from the color liquid crystal display device 101 is transmitted with changing its polarization through 90 degrees, effecting the wobbling operation by changing the location to be emitted from the birefringence plate 106 in accordance with such direction of polarization. It should be noted that, since the color liquid crystal display device 101 retains the image of the preceding field until rewriting of the image of the next field, one of the electrodes of the polarization changing liquid crystal plate 105 is divided into parts each with a plurality of lines such as 5 lines. The other electrode is used as a common electrode and application of voltage is controlled by selecting the one of the electrodes in accordance with the timing of line scan of the color liquid crystal display device 101.

The following operation is performed when alternately displaying odd field images and even field images on the color liquid crystal display device 101. In particular, a case is supposed here as shown in FIG. 2A that the horizontal pixel pitch is Px and the vertical pixel pitch is Py of a pixel group in delta array of the color liquid crystal display device 101. An oblique wobbling operation of 0.75 Px in the horizontal direction and 0.5 Py in the vertical direction, for example, is performed by the above described wobbling device 103 so that the pixel array of the color liquid crystal display device 101 is located at the position as indicated by the broken lines in FIG. 2B when an odd field image is to be displayed, while the pixel array is located at the position indicated by solid lines when an even field is to be displayed. Specifically, if for example Px is 18 μm and Py is 47.5 μm, the wobbling operation is effected so as to achieve an oblique distance of about 27.3 μm, shifted by 13.5 μm horizontally and 23.75 μm vertically.

For this reason, a crystallographic axis 106a of the birefringence plate 106 is set as shown in FIG. 3 in a direction inclined with respect to the XY coordinate of on the color liquid crystal display device surface and Z direction which is normal thereto. Here, when the direction of polarization of incidence agrees with the direction of polarization of light from the color liquid crystal display device, the light from the color liquid crystal display device is transmitted as extraordinary rays so as to shift the pixels. When the direction of polarization of incidence is rotated through 90 degrees with respect to the direction of polarization of light from the color liquid crystal display device, it is transmitted intact as ordinary rays without shifting the pixels.

In this manner, as shown in FIG. 4, when the image of an odd field is to be displayed on the color liquid crystal display device 101, voltage application to the region of the polarization changing liquid crystal plate 105 corresponding to the horizontal lines to be rewritten is turned ON, so as to transmit the light from such lines intact without rotating the direction of polarization through 90 degrees. The light is emitted by the birefringence plate 106 as extraordinary rays to shift the pixels. On the other hand, when the image of an even field is to be displayed, voltage application to the region of the polarization changing liquid crystal plate 105 corresponding to the horizontal lines to be rewritten is turned OFF, so as to transmit the light from the lines as rotated in the direction of polarization through 90 degrees, causing the birefringence plate 106 to emit the light intact as ordinary rays without shifting the pixels.

By performing wobbling operation in the above manner, it is possible to double resolution in both a horizontal direction and a vertical direction of the color liquid crystal display device. In general, however, a liquid crystal device is characteristically slow in rise time and fall time and is inferior in transient response characteristics, since changing of the orientation of liquid crystal molecules is delayed with respect to a change in applied voltage due to the viscosity possessed by the liquid crystal which is used in the device. Accordingly, in a liquid crystal display apparatus using wobbling operation, too, a delay in response speed occurs of both a liquid crystal display device serving as the image display device and a polarization changing liquid crystal plate which is used as the wobbling device, resulting in a problem of lowered resolution.

On the other hand, a disclosure has been made in Japanese patent application laid open No. 3-212615 with respect to an afterimage canceling circuit for canceling afterimage resulting from the transient response characteristics of a liquid crystal, including a means for obtaining a difference signal of the video signals separated by one frame period or one field period from the video signal to be displayed by the liquid crystal display apparatus and a means for providing an output by adding the above difference signal to input video signal.

However, the one disclosed in the above publication relates to improvement in transient response characteristics in a stand-alone liquid crystal display apparatus, and no mention has been made therein with respect to its application to an image display apparatus in which an wobbling operation is performed to achieve a higher resolution. Further, none has been known to consider a delay in response speed in the polarization changing liquid crystal plate to be used as a wobbling device.

SUMMARY OF THE INVENTION

To eliminate the above problems in image display apparatus adapted to improve resolution by performing an optical wobbling operation, it is a main object of the present invention to provide an image display apparatus in which it is possible to reduce degradation in resolution of image due to the response characteristics of at least one of an image display device and a means for wobbling in a predetermined direction the optical axis of light from the image display device.

In accordance with a first aspect of the invention, there is provided an image display apparatus adapted to improve resolution, including an image display device having a display section methodically arraying a plurality of pixels, an optical axis wobbling means for wobbling in predetermined directions the optical axis of light emitted from the display section of the image display device based on input of video signals, and an image display control means for causing the image display device to display different images in synchronization with the wobbling of the optical axis by the optical axis wobbling means. The apparatus comprises a video signal correction means for correcting the input video signals to reduce degradation in resolution due to response performance of at least one of the image display device and the optical axis wobbling means.

In the image display apparatus constructed as the above, it is possible to reduce degradation in resolution due to response characteristics of at least one of the image display device and the optical axis wobbling means by driving the image display device by video signals corrected by the video signal correction means. The above object is thereby accomplished.

It is another object of the present invention to provide an image display apparatus capable of correcting video signals correspondingly to a difference in response characteristics by the wobbling directions of the optical axis wobbling means.

In accordance with a second aspect of the invention, the video signal correction means of the image display apparatus according to the above first aspect is so constructed as to adjust correction amount corresponding to the wobbling directions of optical axis by the optical axis wobbling means.

By constructing in this manner, even when a large difference in response characteristics occurs by the wobbling directions of the optical axis wobbling means, it is possible to corresponds thereto to correct input video signal at a high accuracy. The above object is thereby accomplished.

It is still another object of the present invention to provide an image display apparatus capable of readily performing correction of video signals.

In accordance with a third aspect of the invention, the video signal correction means of the image display apparatus according to the above first aspect is constructed so as to perform correction by using video signal of the current field and video signal of the preceding field.

By thus using video signals of the current field and preceding field, it becomes possible to readily generate a correction video signal. The above object is thereby accomplished.

It is yet another object of the present invention to provide an image display apparatus capable of more accurately correcting video signals.

In accordance with a fourth aspect of the invention, the video signal correction means of the image display apparatus according to the above first aspect is constructed so as to perform correction by using video signal of the current field and video signals of a plurality of past fields.

By thus using video signals of the current field and plurality of past fields, computation can be accurately performed of a quantity of leakage light and the like due to response characteristics of the optical axis wobbling means during the preceding field, making it possible to generate a more accurate correction video signal. The above object is thereby accomplished.

It is a further object of the present invention to provide an image display apparatus of which a reduction in price is possible by using a memory having a relatively small capacity.

In accordance with a fifth aspect of the invention, the video signal correction means of the image display apparatus according to the above third or fourth aspect includes a memory for storing video signals of the preceding field or the plurality of past fields, the number of quantization levels of the video signals of the preceding field or the plurality of past fields to be stored to the memory being set smaller than the number of quantization levels of the above described input video signals.

Since, in generating correction video signals by the video signal correction means, a precise difference is not required between the video signal of the current field and the video signal of the preceding field or the plurality of past fields, it is possible as in the above fifth aspect to make smaller the number of quantization levels of the video signal of the preceding field or the plurality of the past fields to be stored to the memory. Accordingly, a reduction in the memory capacity becomes possible and a lower price can be achieved. The above object is thereby accomplished.

It is a further object of the present invention to provide an image display apparatus of which a further reduction in price is possible by simplifying the video signal correction means.

In accordance with a sixth aspect of the invention, the video signal correction means of the image display apparatus according to the above first aspect is constructed so as to perform correction by using video signal of the current field and an interpolation data between the lines of the current field.

By constructing in this manner, the video signal correction means can be constructed by using a line memory instead of a field memory, making a further reduction in price possible. The above object is thereby accomplished.

It is a further object of the present invention to provide an image display apparatus of which a reduction in price is possible by simplifying the construction in a digital-to-analog conversion section.

In accordance with a seventh aspect of the invention, the image display apparatus according to the above first aspect includes a driver circuit for the image display device and is constructed so as to perform correction processing by matching the timing of sampling at the video signal correction means and the timing of sampling at the driver circuit for the image display device.

By constructing in this manner, deglitch processing and interpolating filter that are generally necessary at the digital-to-analog conversion section become unnecessary, making it possible to achieve a lower price. The above object is thereby accomplished.

It is a further object of the present invention to provide an image display apparatus capable of correcting color video signals by using a small-sized video signal correction means.

In accordance with an eighth aspect of the invention, the video signals in the image display apparatus according to the above first aspect are color video signals, the video signal correction means constructed so as to commonly correspond to respective color signals to sequentially correct the respective color signals.

By constructing in this manner, it is possible to generate correction video signals of the respective colors by a single video signal correction means, making it possible to achieve a reduction in price. The above object is thereby accomplished.

It is a further object of the present invention to provide an image display apparatus in which it is possible to readily generate a delayed video signal for corresponding to the wobbling of optical axis by the optical axis wobbling means.

In accordance with a ninth aspect of the invention, the image display apparatus according to the above first aspect includes an analog-to-digital conversion means and a digital-to-analog conversion means at stages before and after the video signal correction means. Delay of video signal corresponding to the width of wobbling by the optical axis wobbling means is generated by a difference in sampling timing at the analog-to-digital conversion means and at the digital-to-analog conversion means.

By constructing in this manner, a delay device and/or analog switch become unnecessary. Further, since control signal of sampling timing formed as a digital signal can be controlled of a delay amount by using an accurate basic clock, the delay amount can be strictly set. Furthermore, since delay amounts of the color video signals of R, G, B can be set by the same control signal, variance in delay amount by individual video signal can be eliminated. The above object is thereby accomplished.

BRIEF DESCRIPTION OF THE DRAWING

FIG. 3 illustrates the operation of a birefringence plate of the wobbling device in the image display apparatus shown in FIG. 1.

DESCRIPTION OF THE PREFERRED EMBODIMENTS

Figure 1:
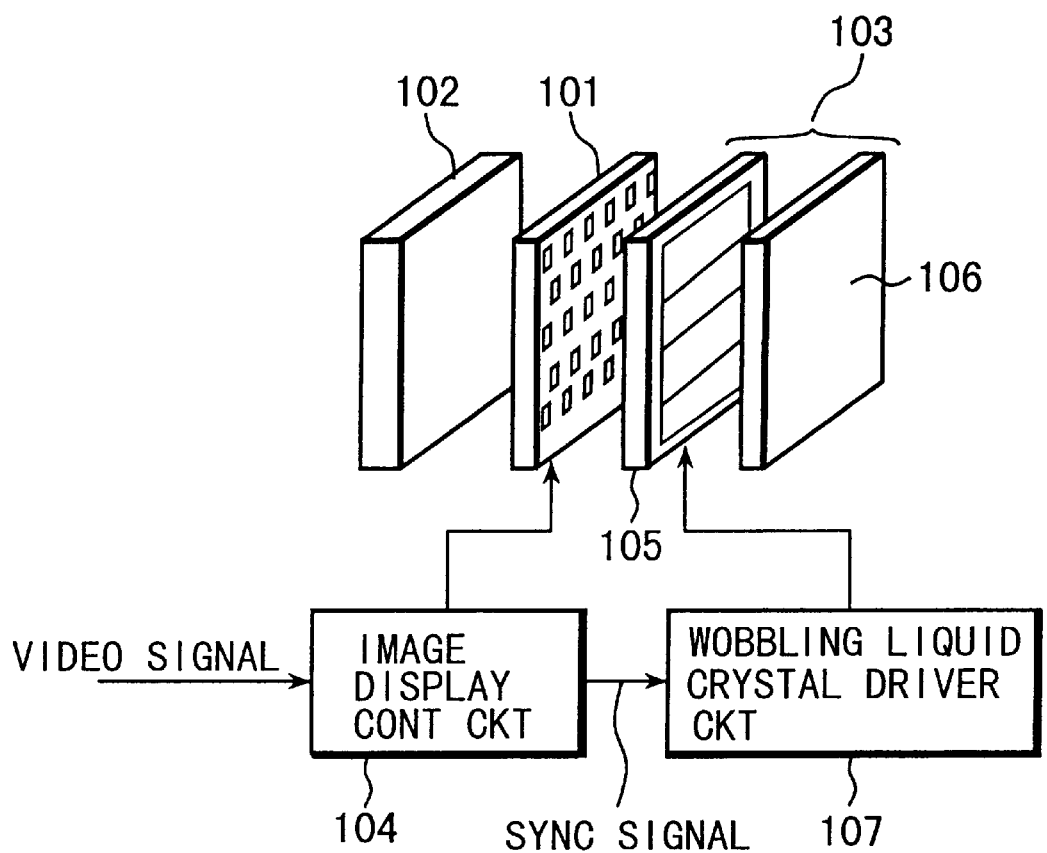
FIG. 1 is a schematic perspective view showing the construction of a conventional image display apparatus in which shifting of the pixels by wobbling operation is performed to display an image.
Figure 2A:
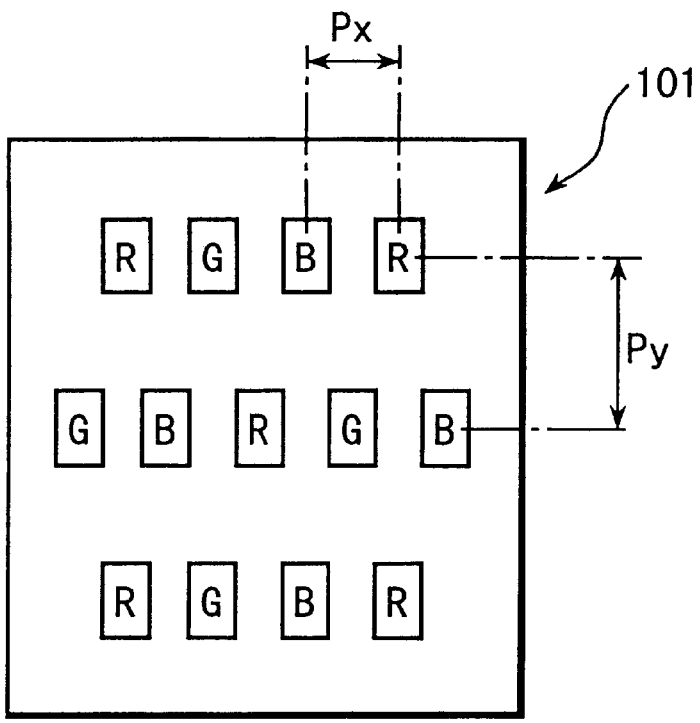
FIGS. 2A, 2B illustrate the operation of a wobbling device in the image display apparatus shown in FIG. 1.
Figure 2B:
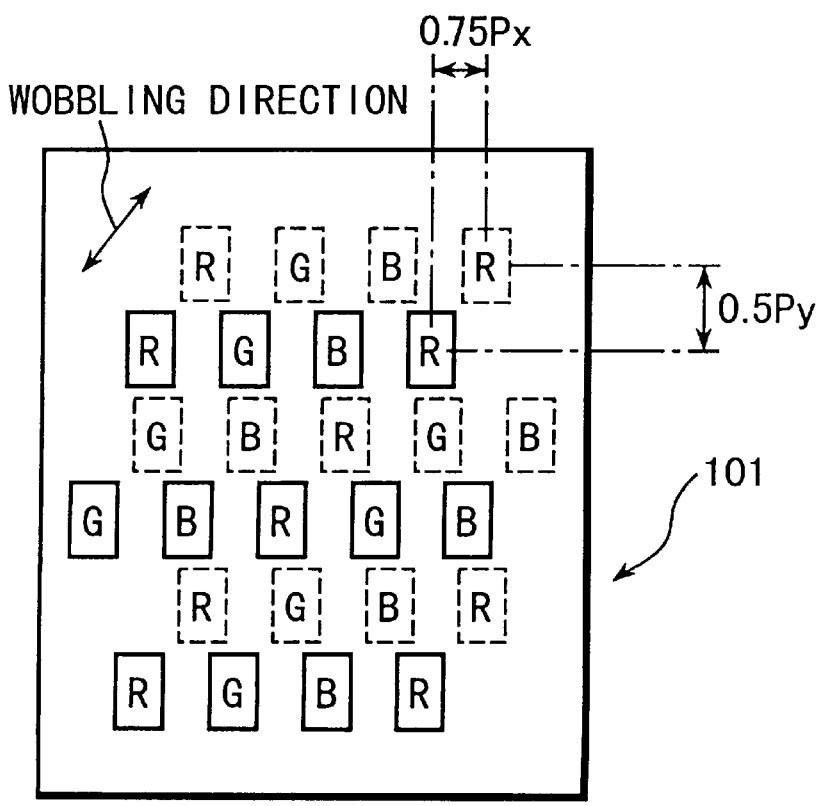
Figure 4:
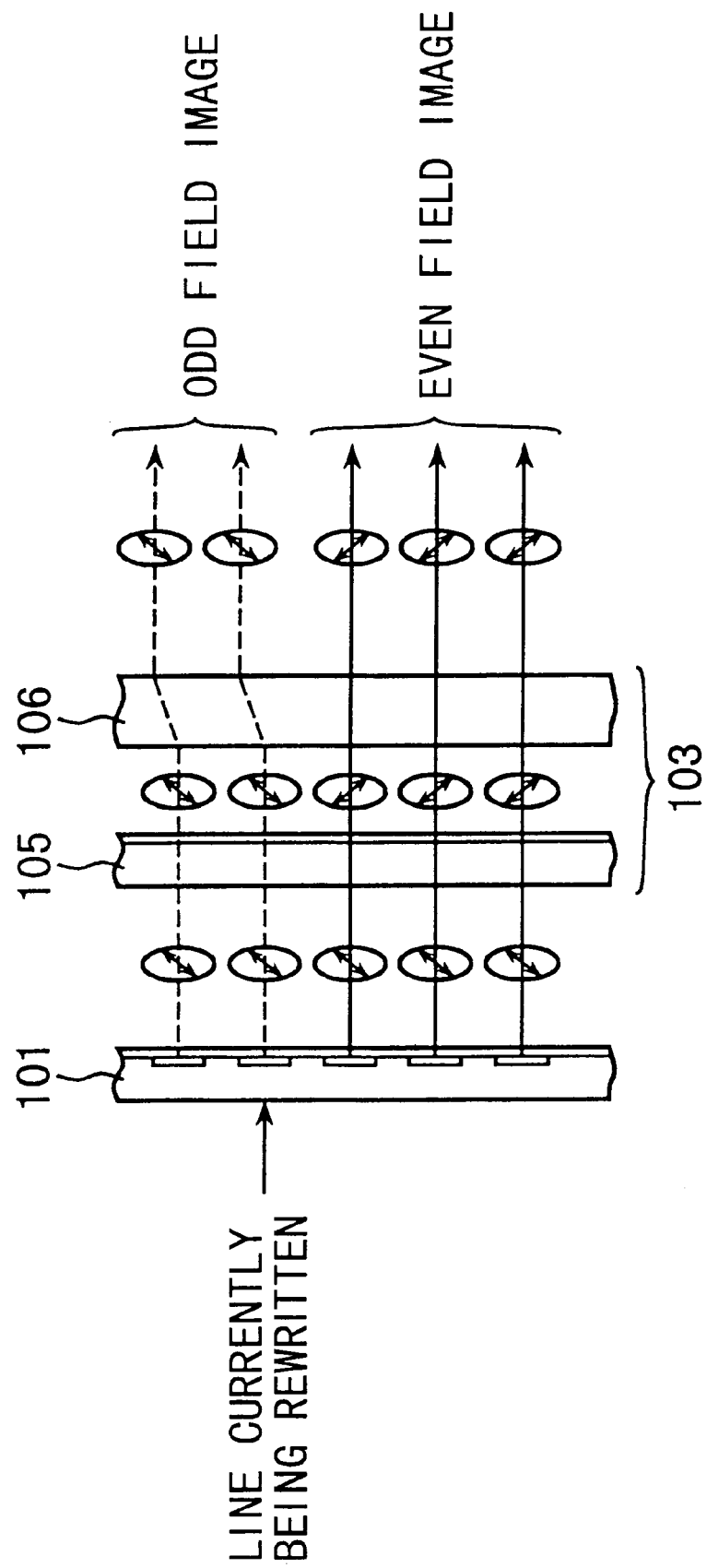
FIG. 4 illustrates the operation of an image display apparatus shown in FIG. 1.
Figure 5:
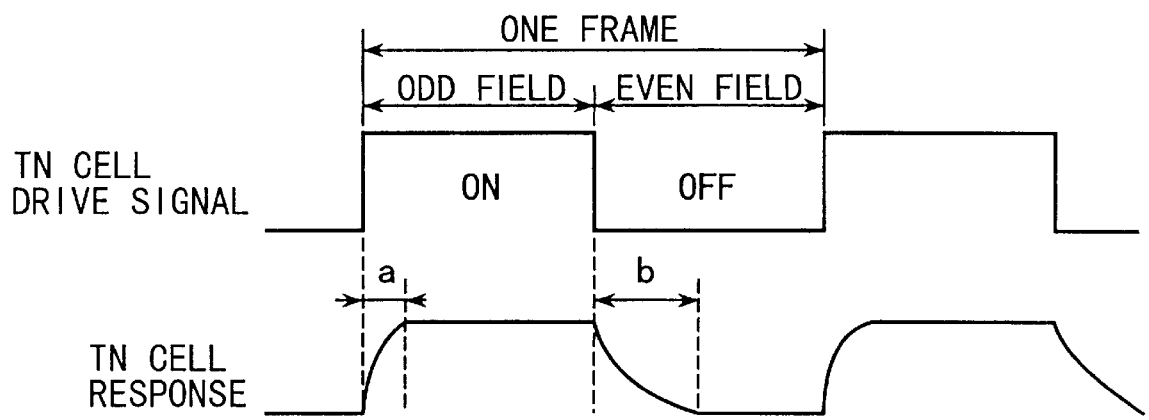
FIG. 5 shows response delay of a TN cell of a wobbling device.
Figure 6:
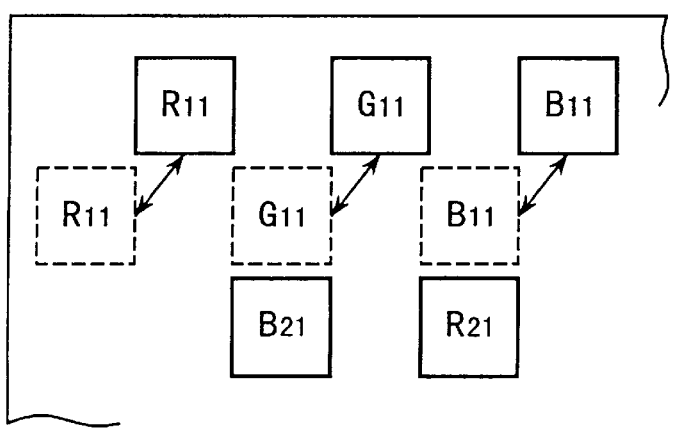
FIG. 6 illustrates degradation in image quality due to response delay of a TN cell.

Some embodiments of the present invention will now be described. First of all, before describing an embodiment, a description will be given in more detail with respect to degradation in image quality such as of resolution due to response delays of a color liquid crystal display device (hereinafter referred to as LCD) and a polarization changing liquid crystal plate (hereinafter referred to as TN cell) of a wobbling device in an image display apparatus using an optical wobbling operation. The degradation in image quality due to response delay of TN cell will first be described. As shown in FIG. 5, when a drive signal, which is ON during the odd field period and is OFF during the even field period in one frame period, is applied to TN cell, delay "a" occurs in the rising (when turned ON) and delay "b" significantly greater than at the time of the rising occurs in the falling (when turned OFF) in the response of TN cell. As shown in FIG. 6, when there is no response delay as in a theoretical situation, the pixel patterns are displayed on the display surface of the image display apparatus only at the locations indicated by solid lines during an odd field period and the pixel patterns are displayed only at the locations indicated by broken lines by the wobbling operation during an even field period. Due to the response delays at ON/OFF of TN cell as described above, however, the pixel patterns are displayed at the locations of both solid lines and broken lines during the periods of response delay "a", "b" at the time of ON/OFF, resulting in a degradation of image quality.

Figure 7:
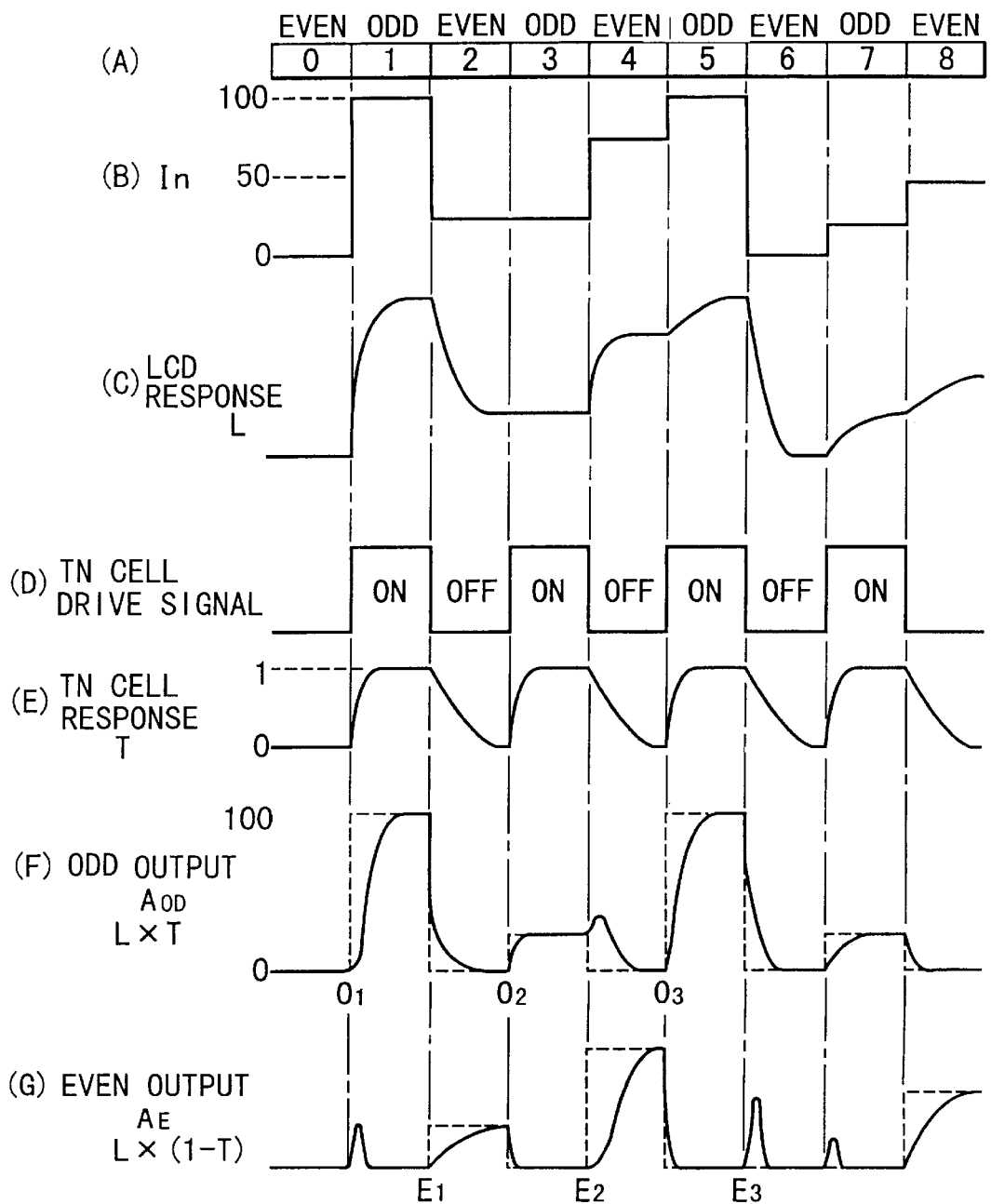
FIG. 7 is a timing chart showing pixel output on the apparatus display surface when response delay of LCD is added to response delay of the TN cell.

A description will be given below with respect to pixel output on the apparatus display surface when response delay of LCD is furthermore added to the response delay of TN cell. FIG. 7 is a timing chart showing waveforms of input/output signals of each device when observing one pixel of LCD. Referring to FIG. 7, (A) represents field numbers.

When an input signal "In" as indicated by (B) is inputted to LCD, an LCD response output "L" as indicated by (C) results due to response delays at the rising and falling of LCD. Further, response "T" of TN cell based on TN cell drive signal indicated by (D) results in a TN cell response output as indicated by (E) in the above described manner due to response delays at ON/OFF thereof. Because of such response delays of both LCD and TN cell, a pixel output "$A_{OD}$" ($=L \times T$) having a waveform as indicated by (F) is thus outputted for the odd fields on the apparatus display surface. It should be noted that the broken line in (F) represents an ideal output waveform in the case where no response delay occurs. On the other hand, a pixel output" $A_E$ [$=L \times (1-T)$] having a waveform as indicated by (G) is outputted for the even fields. As can be seen from the pixel outputs $A_{OD}$, $A_E$ indicated by (F), (G), outputs occur at points in time where no output should be made. Contrast ratio is reduced and resolving power is lowered.

Figure 8:
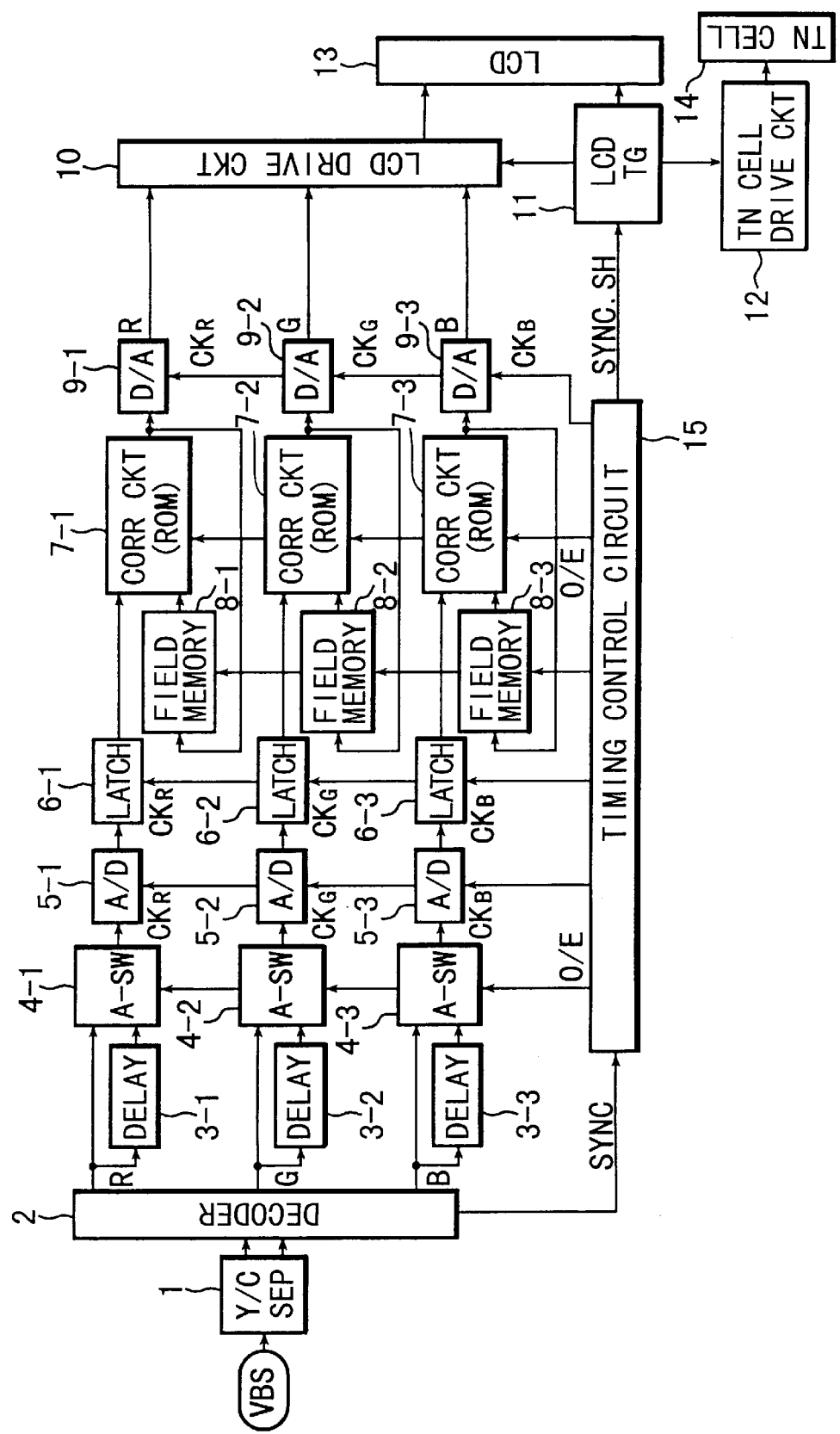
FIG. 8 is a block diagram showing a first embodiment of image display apparatus according to the present invention.

The present invention has been made to mitigate degradation in image quality such as resolving power resulting from response delays of the above described LCD and/or TN cell. An embodiment thereof will now be described. FIG. 8 is a block diagram showing the overall construction of a first embodiment of the image display apparatus according to the present invention. Referring to FIG. 8: 1, a Y/C separate circuit for separating luminance signal and color signal from each other of input color video signal VBS; 2, a decoder for converting the color signal into R, G, B signals; 3-1, 3-2, 3-3, delay circuits, to be described later in more detail, for forming video signals of even fields delayed by time corresponding to the shift amount by wobbling operation; 4-1, 4-2, 4-3, analog switches for switching between video signals of odd fields without delay and the delayed video signals of even fields.

Further: 5-1, 5-2, 5-3, analog-to-digital converters; 6-1, 6-2, 6-3, latch circuits for temporarily retaining A/D-converted input image data; 7-1, 7-2, 7-3, correction circuits, to be described later in more detail, for generating correction R, G, B signals by considering such as the signals of the current field and the signals of the preceding field which are stored to field memories 8-1, 8-2, 8-3. Furthermore: 9-1, 9-2, 9-3, digital-to-analog converters; 10, an LCD drive circuit for forming LCD drive signal from D/A-converted correction R, G, B signals; 11, a timing signal generation circuit for LCD; 12, a TN cell drive circuit; 13, LCD; 14, TN cell; 15, a timing control circuit for receiving composite synchronizing signal SYNC from the decoder 2 and supplying a timing pulse to each section.

Figure 9:
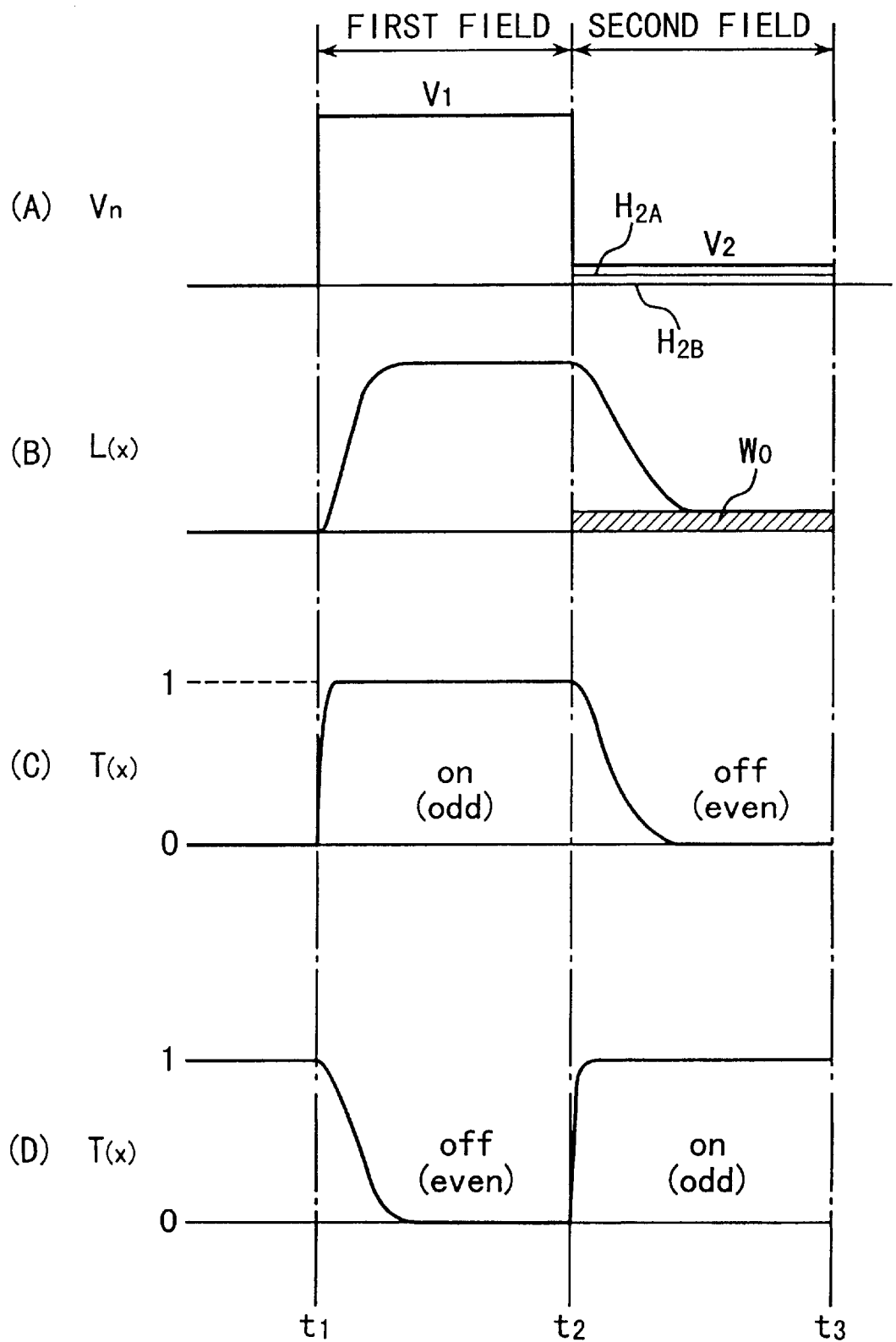
FIG. 9 shows signal waveforms for explaining the principle of correction of response delay of LCD and TN cell in the first embodiment shown in FIG. 8.

A description will now be given in detail with respect to construction as well as correction operation, etc., of the correction circuit section in the above first embodiment. The principle of correcting response delays of LCD and TN cell will be described first by way of the signal waveforms in FIGS. 9 and 10. (A) in FIG. 9 indicates uncorrected video signal Vn, supplied to one of the pixels of LCD, $V_1$ representing the signal level of a first field and $V_2$ representing the signal level of a second field. Here, $H_{2A}$ indicates a correction signal level when field correction is to be performed in the second field in the case where the first field is an odd field. Further, $H_{2B}$ indicates a correction signal level when field correction is to be performed in the second field in the case where the first field is an even field. (B) of FIG. 9 represents response characteristics of transmitted light amount L(x) through LCD in the case where video signal $V_n$ at uncorrected $V_1$, $V_2$ level as shown in (A) of FIG. 9 is supplied to LCD. The hatched portion represents a quantity of light $W_0$ during the second field in the case of no response delays of LCD and TN cell. (C) of FIG. 9 indicates response characteristics T(x) of optical rotation of TN cell when the first field is an odd field, and (D) of FIG. 9 indicates response characteristics T(x) of optical rotation of TN cell when the first field is an even field.

Figure 10:
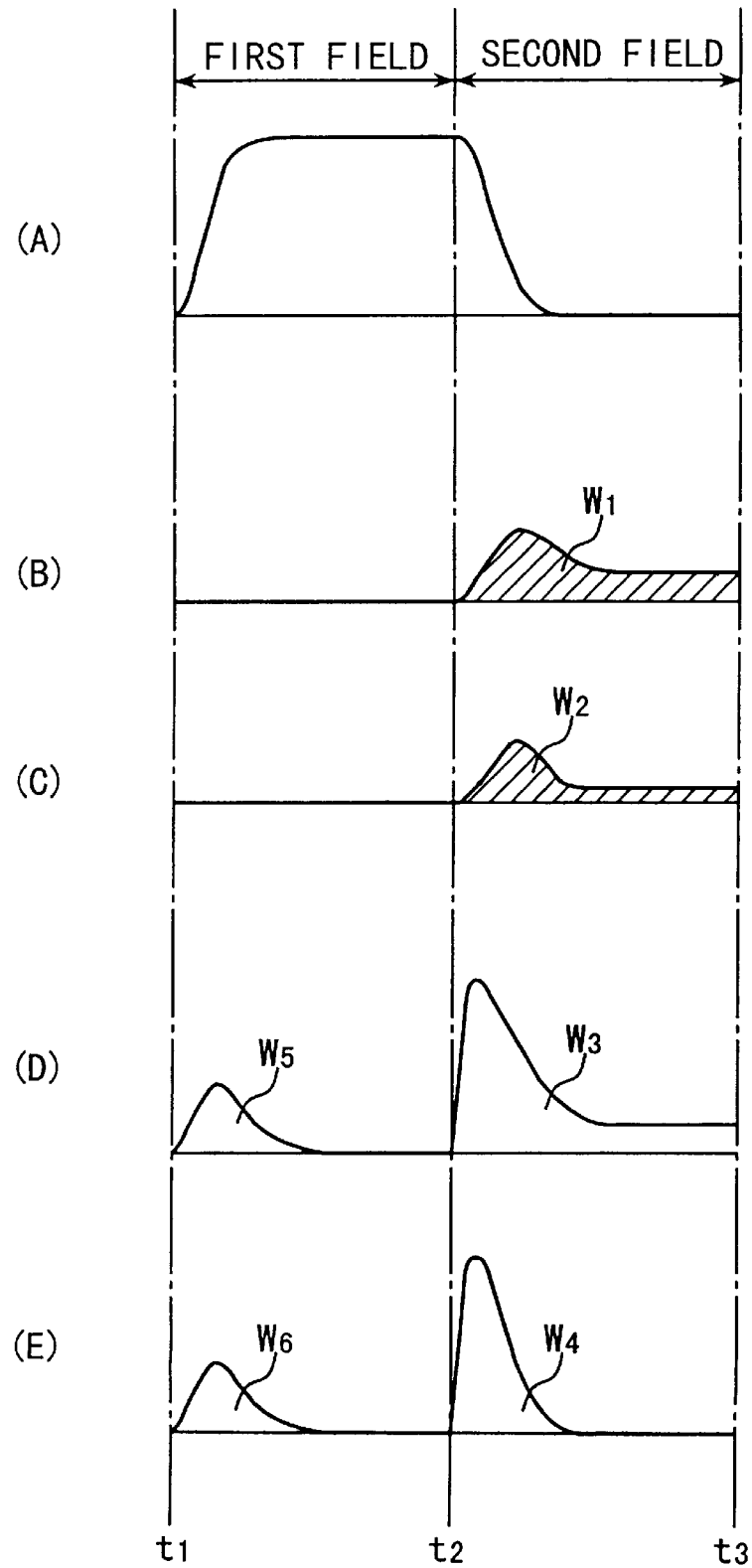
FIG. 10 shows waveforms continued from the waveforms shown in FIG. 9 to explain the principle of correction.

(A) of FIG. 10 indicates the quantity of light emitted at odd-number line location on the apparatus display surface when the first field is an odd field, becoming dull as shown due to response delays of LCD and TN cell. (B) of FIG. 10 is a quantity of light $W_1$ emitted at even-number line location on the apparatus display surface when the first field is an odd field. The quantity of light $W_1$ is dull due to response delays of LCD and TN cell. $W_0 < W_1$ results when compared with the quantity of light $W_0$ in the case of receiving the signal indicated by (A) of FIG. 9 and no response delays of LCD and TN cell. (C) of FIG. 10 indicates a quantity of light $W_2$ emitted at even-number line location on the apparatus display surface in the case where corrected video signal $H_{2A}$ is supplied at timing of $t_2$, i.e., in the second field. The quantity of light $W_2$ is equal to the quantity of light $W_0$ in the case of no response delay and there exists the relationship of $V_2 > H_{2A}$ between the signal level of $H_{2A}$ and the uncorrected signal level $V_2$.

(D) of FIG. 10 indicates a quantity of light $W_3$ emitted at odd-number line location on the apparatus display surface when the first field is an even field. The quantity of light $W_3$ is dull due to response delays of LCD and TN cell. $W_0 < W_3$ results when compared with the quantity of light $W_0$ in the case of receiving the signal indicated by (A) of FIG. 9 and no response delays of LCD and TN cell. Further, if it is compared with the quantity of light $W_1$ emitted at even-number line location on the apparatus display surface when the first field is an odd field, $W_1 < W_3$ results. It should be noted that, in (D) of FIG. 10, $W_5$ represents the quantity of leakage light due to response delay of TN cell. (E) of FIG. 10 indicates a quantity of light $W_4$ emitted at odd-number line location on the apparatus display surface in the case where corrected video signal $H_{2B}$ is supplied at timing of $t_2$, i.e., in the second field. The quantity of light $W_4$ is equal to the quantity of light $W_0$ in the case of no response delays and there exists the relationship of $V_2 > H_{2B}$, $H_{2A} > H_{2B}$ between the signal level of $H_{2B}$ and the signal levels $V_2$, $H_{2A}$. It should be noted that, in (E) of FIG. 10, $W_6$ represents the quantity of leakage light due to response delay of TN cell and is of the same value as $W_5$.

A description will now be given with respect to a method of setting correction video signal $H_{2A}$ in the case where field correction is to be performed. The quantity of light $W_1$ in (B) of FIG. 10 varies depending on what state of signal the signal of the preceding field has been. The correction signal $H_{2A}$ is thus set so that the quantity of light $W_2$ within the second field shown in (C) of FIG. 10 is equal to the quantity of light $W_0$ in the ideal state, considering: video signal $H_{1a}$ supplied to LCD during the preceding field at the timing of $t_2$; the currently inputted video signal $I_2$; and, in addition, the operation status of TN cell, since response delays differ between ON and OFF of TN cell. It should be noted that the status of TN cell is judged from field discriminant signal of the video signal.

Figure 11:
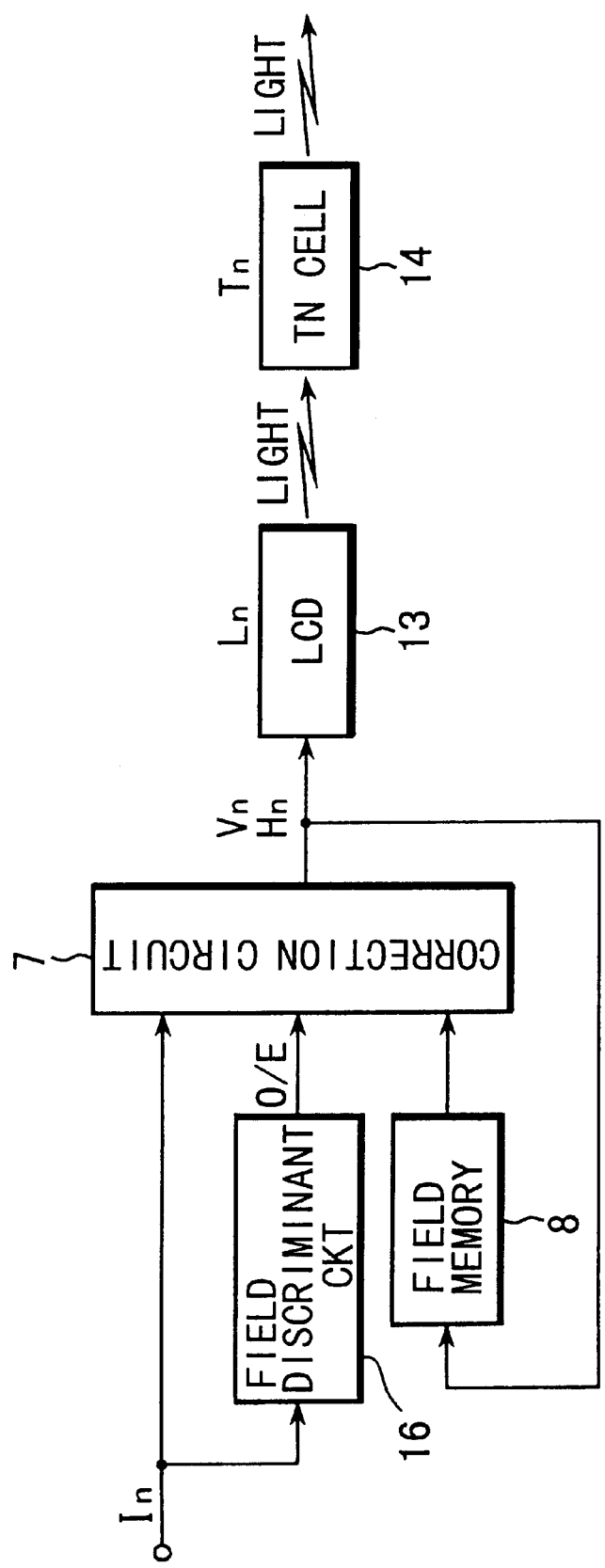
FIG. 11 is a schematic diagram showing as an extract the correction circuit section in the first embodiment shown in FIG. 8.

Since data of the picture area preceding the current one is necessary for the correction circuit, the field memory 8 is provided as shown in the block diagram of FIG. 11 to store the signal of the preceding field. The stored data and the signal of the current field are inputted to the correction circuit 7 and at the same time a field discriminant signal is inputted thereto from a field discriminant circuit 16. The correction signal $H_{2A}$ outputted from the correction circuit 7 is applied to LCD 13. It should be noted that, as shown in FIG. 8, the field discriminant signal is actually obtained from the timing control circuit 15.

A description will now be given with respect to the method of setting a correction video signal $H_{2C}$ when frame correction is to be performed. Here, the numeral "2" of the subscript of the correction video signal symbol $H_{2C}$ indicates a field number and the letter "c" indicates the frame correction. As is indicated by (D) of FIG. 10, the quantity of light $W_3$ emitted at the odd-number line location on the apparatus display surface when the first field is an even field is dull as shown due to response delays of LCD and TN cell. While the state without any quantity of light is ideal in the first field, i.e., at the even-number line locations of the display surface, a leakage of light occurs as the quantity of light of $W_5$ due to the response delay of TN cell. This quantity of leakage light $W_5$ is unchanged in amount even if corrected at the timing of $t_2$. The quantity of leakage light $W_5$ is thus supposed from the video signal $H_{1C}$ which has been supplied to LCD in the preceding field and TN cell response $T(x)$. The correction signal $H_{2C}$ is set so that $W_0=W_4+W_6$ ($W_6$ being the same quantity of light as $W_5$) results in (E) of FIG. 10. In this manner, the correction video signal in frame correction and the correction video signal in field correction are different from each other in their correction value. It should be noted that $W_5$ is estimated from $[k \times H_{1C} \times T(x)]$, where "k" is a coefficient.

Figure 12:
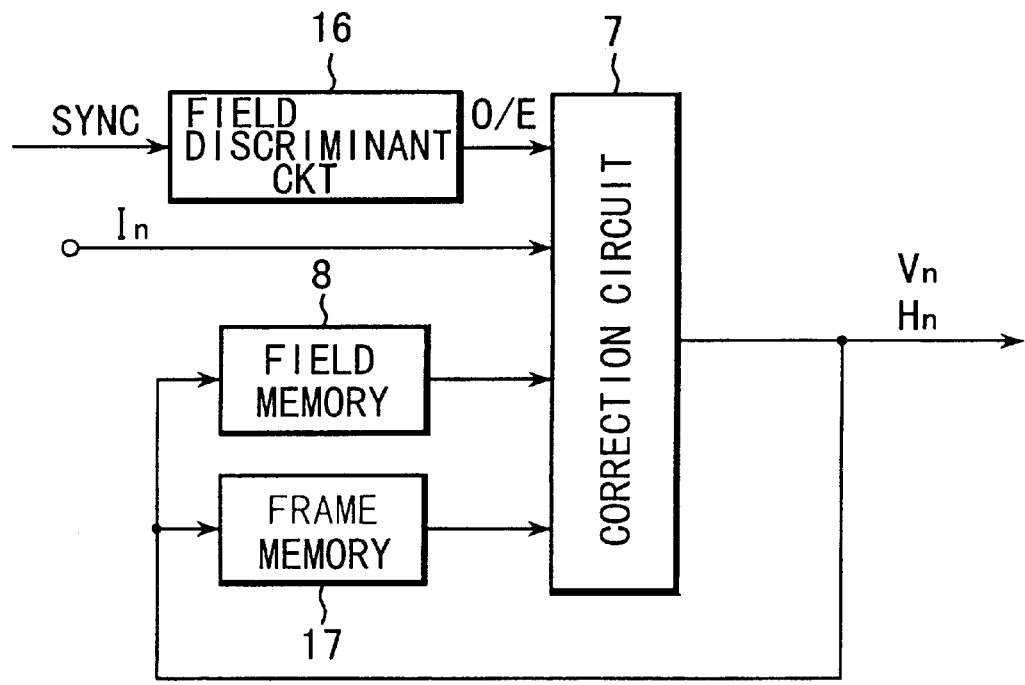
FIG. 12 is a schematic diagram showing a modification of the correction circuit section shown in FIG. 11.

Further, a strict computation of the leakage light $W_5$ (=$W_6$) becomes possible by considering the video signal $H_{1C}$ supplied to LCD during the preceding field and response characteristics of LCD and response characteristics of TN cell due to video signal $H_{0C}$ which precedes such video signal $H_{1C}$ by one field. For this reason, a frame memory 17 for taking in the signal of the frame preceding the current one is provided in the correction circuit as shown in the block diagram of FIG. 12 in addition to the field memory 8 which is to take in the signal of the field preceding the current one. Since, thereby, the quantity of leakage light can be predicted by considering two entire picture areas, a more accurate correction can be effected.

Figure 13:
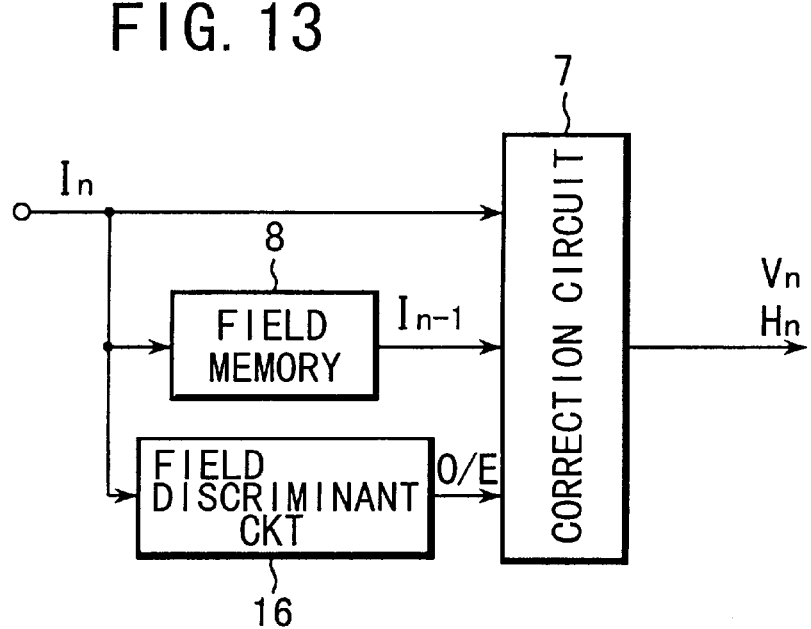
FIG. 13 is a schematic diagram showing another modification of the correction circuit section shown in FIG. 11.

It should be noted that, in the above described principle of correction, the signal of the preceding field is shown as that taken in from a corrected signal. Since, however, it suffices to know what state of signal the signal of the preceding field has been, it is also possible as shown in FIG. 13 to use the signal of the preceding field before correction.

The above principle of correction has been described with respect to the case where a video signal as shown in (A) of FIG. 9 has been inputted. A description will now be given with respect to correction of the general response delays of LCD and TN cell. First, we assume: In (n: field number) is an input video signal; Vn is an uncorrected LCD drive signal; Hn(In,Hn−1) or Hn(In,In−1) or Hn(In,Hn−1,Hn−2) is a correction LCD drive signal; L(Hn,Hn−1,t) is response characteristics of LCD, where "t" is the time elapsed; and T(s,t) is response characteristics of TN cell, where "s" is the setting of operating state (ON or OFF) and "t" is the time elapsed.

A description will be given below with respect to correction methods of: the case of correcting one field (TN cell is ON during odd field); the case of correcting one frame (using a frame memory); and the case of correcting one frame (not using a frame memory).

(1) One Field Correction

Supposing $L_0(Vn)$ as the quantity of light of LCD without a response delay and one field time $t_f=(t_{n+1}-t_n)$, an ideal quantity of light Wn is given by formula (1)

$$W_n = L_0(V_n) \times (t_{n+1}-t_n) \quad (1)$$

When "n" is an odd number, i.e., at the time of correcting an odd field, the quantity of light at odd-number line WHn(odd) on the apparatus display surface after correction is given by formula (2)

$$WHn(odd) = \Sigma\{L(H_n, H_{n-1}, t) \times T(on, t)\} \quad (2)$$

When "n" is an even number, i.e., at the time of correcting an even field, the quantity of light at even-number line WHn(even) on the display surface after correction is given by formula (3)

$$WHn(even) = \Sigma[L(H_n, H_{n-1}, t) \times \{1-T(off, t)\}] \quad (3)$$

Then, Hn that results in Wn=WHn(odd) and Wn=WHn(even) is set as the correction value. It should be noted that the range of summation of the above summation symbol $\Sigma$ is from t=0 to t=$t_f$.

(2) One Frame Correction (using frame memory)

When "n" is an odd number, i.e., at the time of correcting an odd field, the quantity of light at odd-number line WHn(odd) on the apparatus display surface after correction is given by formula (4)

$$WHn(odd) = \Sigma\{L(H_n, H_{n-1}, t) \times T(on, t)\} + \Sigma\{L(H_{n-1}, H_{n-2}, t) \times T(off, t)\} \quad (4)$$

When "n" is an even number, i.e., at the time of correcting an even field, the quantity of light at even-number line WHn(even) on the display surface after correction is given by formula (5)

$$WHn(even) = \Sigma[L(H_{n+1}, H_n, t) \times \{1-T(off, t)\}] + \Sigma[L(H_n, H_{n-1}, t) \times \{1-T(on, t)\}] \quad (5)$$

Then, Hn that results in Wn=WHn(odd) and Wn=WHn(even) is set as the correction value. It should be noted that the range of summation of the above summation symbol $\Sigma$ is from t=0 to t=$t_f$.

(3) One frame correction (not using frame memory)

When "n" is an odd number, i.e., at the time of correcting an odd field, the quantity of light at odd-number line WHn(odd) on the apparatus display surface after correction is given by formula (6)

$$WHn(odd) = \Sigma\{L(H_n, H_{n-1}, t) \times T(on, t)\} + (k_{off} \times H_{n-1}) \quad (6)$$

where $k_{off}$ is a coefficient.

When "n" is an even number, i.e., at the time of correcting an even field, the quantity of light at even-number line WHn(even) on the display surface after correction is given by formula (7)

$$WHn(even) = \Sigma[L(H_{n+1}, H_n, t) \times \{1-T(off, t)\}] + (k_{on} \times H_{n-1}) \quad (7)$$

where $k_{on}$ is a coefficient.

Then, Hn that results in Wn=WHn(odd) and Wn=WHn(even) is set as the correction value. It should be noted that the range of summation of the summation symbol $\Sigma$ in the above equations (6), (7) is from t=0 to t=$t_f$.

In the first embodiment shown in FIG. 8, an 8-bit signal processing, for example, is performed usually all the way from the analog to digital conversion by the analog-to-digital converters 5-1, 5-2, 5-3 to the digital to analog conversion by the digital-to-analog converters 9-1, 9-2, 9-3. An excessively detailed level of data, however, is not necessary with respect to data of the preceding field, etc., to be taken in for generating correction signal at the correction circuits 7-1, 7-2, 7-3. It is possible to capture the general characteristics thereof to predict the quantity of leakage light and the like from such characteristics. Accordingly, data of the preceding field taken into the field memory 8-1, 8-2, 8-3 can be lower in resolution (number of quantization levels) such as of 4 bits. It is thereby possible to reduce the memory capacity of the field memories 8-1, 8-2, 8-3.

Figure 14A:
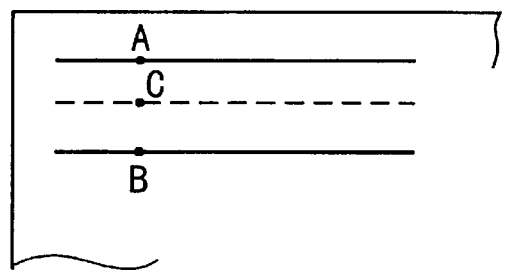
FIGS. 14A, 14B are a conceptual diagram for explaining a second embodiment and a schematic diagram for showing the construction of a correction circuit section thereof.
Figure 14B:
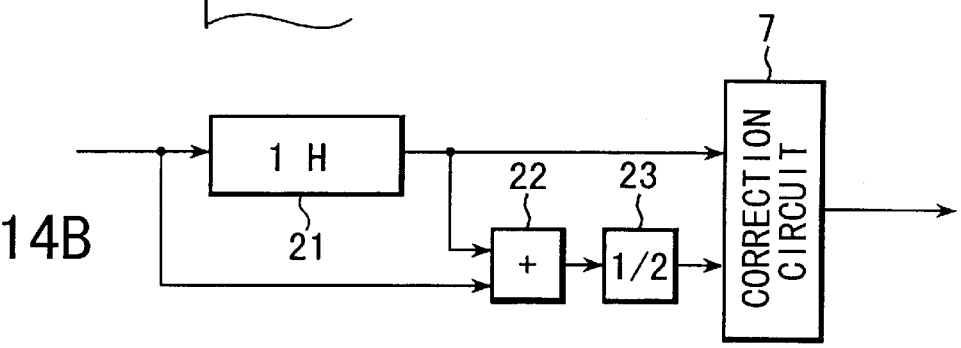

The above described first embodiment has been shown as that using a field memory in the correction circuit to taken in the data of the preceding field. A field memory requires a large-capacity memory corresponding to an entire picture area and also causes a problem of higher cost. A second embodiment capable of eliminating this problem will thus be described below. This embodiment is designed to generate correction signals by using a memory corresponding to one line. Supposing as shown in FIG. 14A, line A, B as the lines of the current field, line C at the middle between line A and line B is regarded as a line of the preceding field and is predicted by taking the average of data of line A and line B. Data of line C is then treated as an approximation of the data in effecting the wobbling operation, i.e., as that of the data which precedes by one field. A correction video signal is formed based on this data of line C. In view of its circuit construction, it is constructed as shown in FIG. 14B by a line memory 21, an adder 22 and a ½ multiplier 23. The case of this embodiment, though image quality may be somewhat degraded for a dynamic picture image, is capable of fully dealing with a static picture image and a correction section can be constructed less expensively.

Figure 15A:
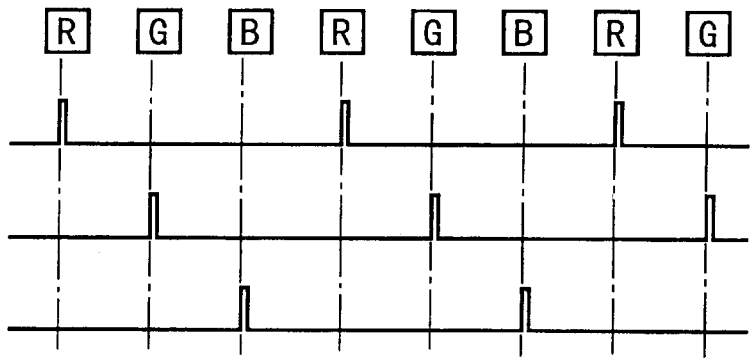
FIGS. 15A, 15B are a conceptual diagram for explaining a third embodiment and a schematic block diagram for showing main portions.
Figure 15B:
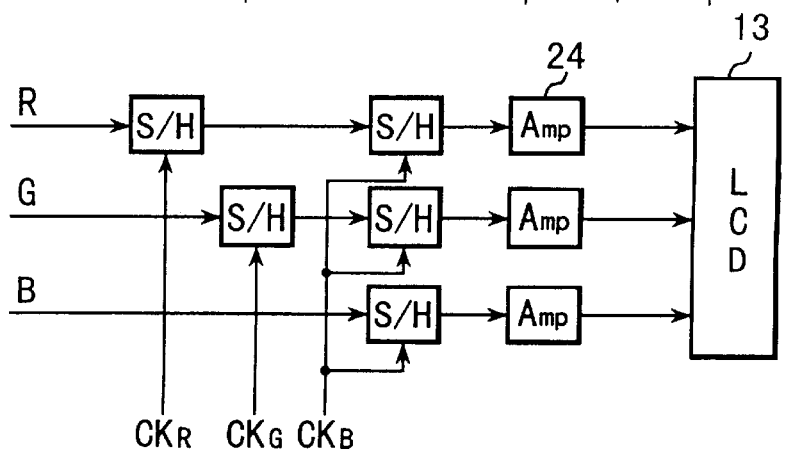

A third embodiment will now be described. This embodiment is constructed so as to match the timing of sampling at the correction circuit and the timing of sampling at the LCD drive circuit. R, G, B video signals are discretely sampled at the analog-to-digital converter and is controlled digitally thereafter. The R, G, B pixels are each discretely arrayed as shown in FIG. 15A also in the pixel array of LCD. Here, R, G, B correction signals to be inputted into the LCD drive circuit 10 are latched as shown in FIG. 15B at sample-and-hold circuits S/H by clock signals $CK_R$, $CK_G$, $CK_B$ which are discretely generated from the timing pulse generation circuit 11 for LCD and are collectively outputted to LCD 13 through amplifiers 24. In the case of an ordinary image processing, the respective video signals of R, G, B are processed at the same timing. In the present embodiment, however, since R, G, B are processed at individual timings, the number of times of sampling can be reduced to ⅓ and the sampling cycle is increased to 3 times the case of an ordinary image processing so that a more room can be provided in the processing time. In the present embodiment, thus, sampling timing of the correction processing at the correction circuits 7-1, 7-2, 7-3 is matched with the sampling timing at the LCD drive circuit 10.

In general, switching is made in synchronization with a clock at a digital-to-analog converter to a constant current source or constant voltage source corresponding to each weight of digital value. If the switching timing is shifted, a glitch pulse occurs. Such glitch pulse is to be removed by interpolation by an interpolation filter through sampling at points shifted in output phase of the digitalto-analog converter. Since the present embodiment is constructed so as to match the sampling timing at the correction circuit and the sampling timing at the LCD drive circuit in the manner as described above, deglitch processing and interpolation filter become unnecessary at the digital-to-analog conversion section.

Figure 16:
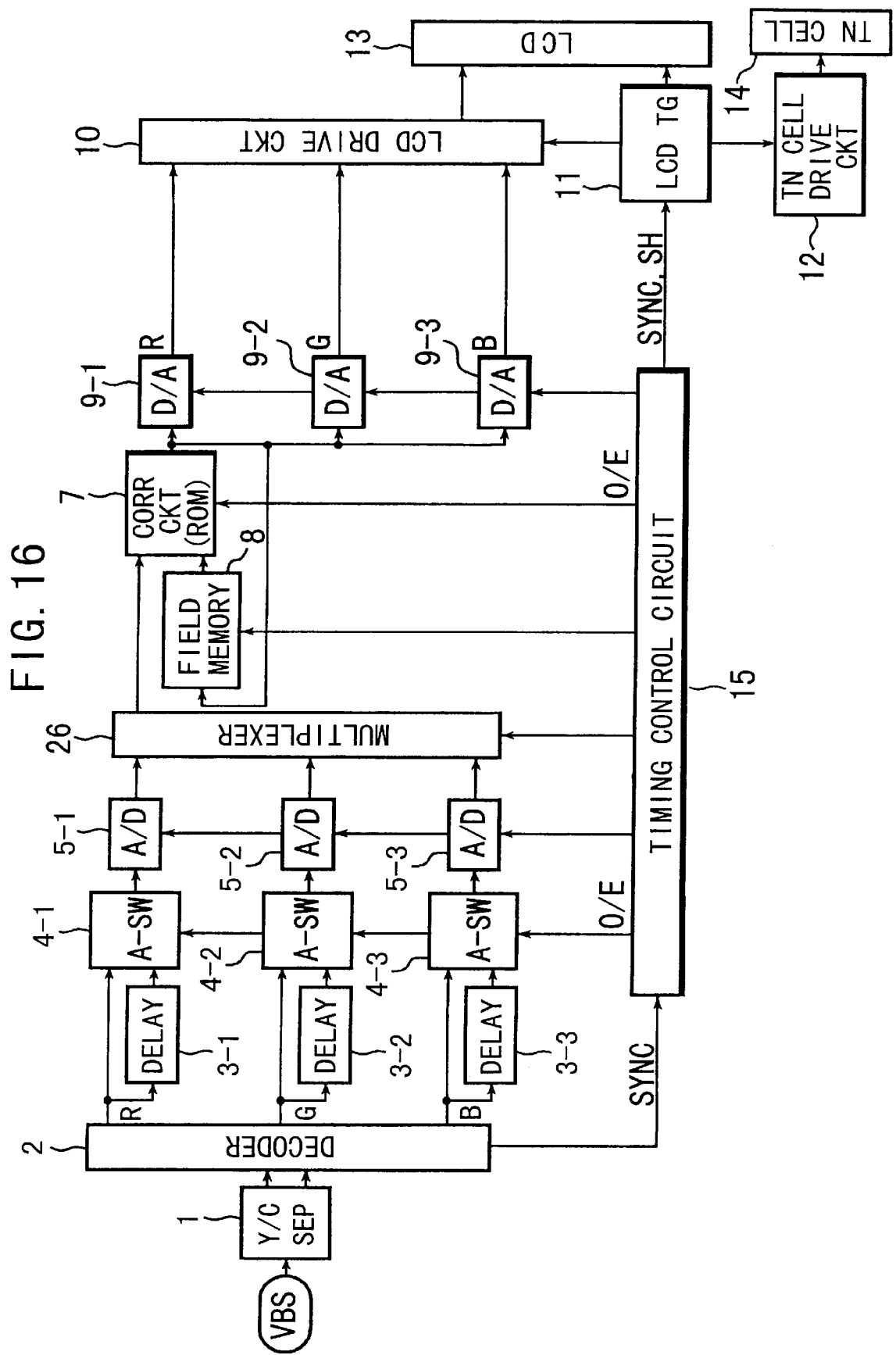
FIG. 16 is a block diagram for showing a fourth embodiment.

In the case of processing in synchronization with the timing pulse of LCD in the first embodiment as shown in FIG. 8, since the correction processing of each of the video signals of R, G, B at the correction circuit 7-1, 7-2, 7-3 is performed at a different timing from another, it is possible to perform correction of the video signals of R, G, B by the use of a single correction circuit by shifting the timing of correction processing. A fourth embodiment will now be shown in FIG. 16 where the correction processing is performed in the above manner by a single correction circuit. In particular, a multiplexer 26 is disposed at the stage succeeding the analog-to-digital converters 5-1, 5-2, 5-3 to multiplex the R, G, B signals. The correction processing is performed by the single correction circuit 7 by shifting the timing for each signal of R, G, B. Data of the preceding filed is sequentially stored in time series of R, G, B at a single field memory 8. In regard of capacity, it is three times the capacity of each field memory to be used in the case where correction processing is individually performed for each of R, G, B.

Figure 17:
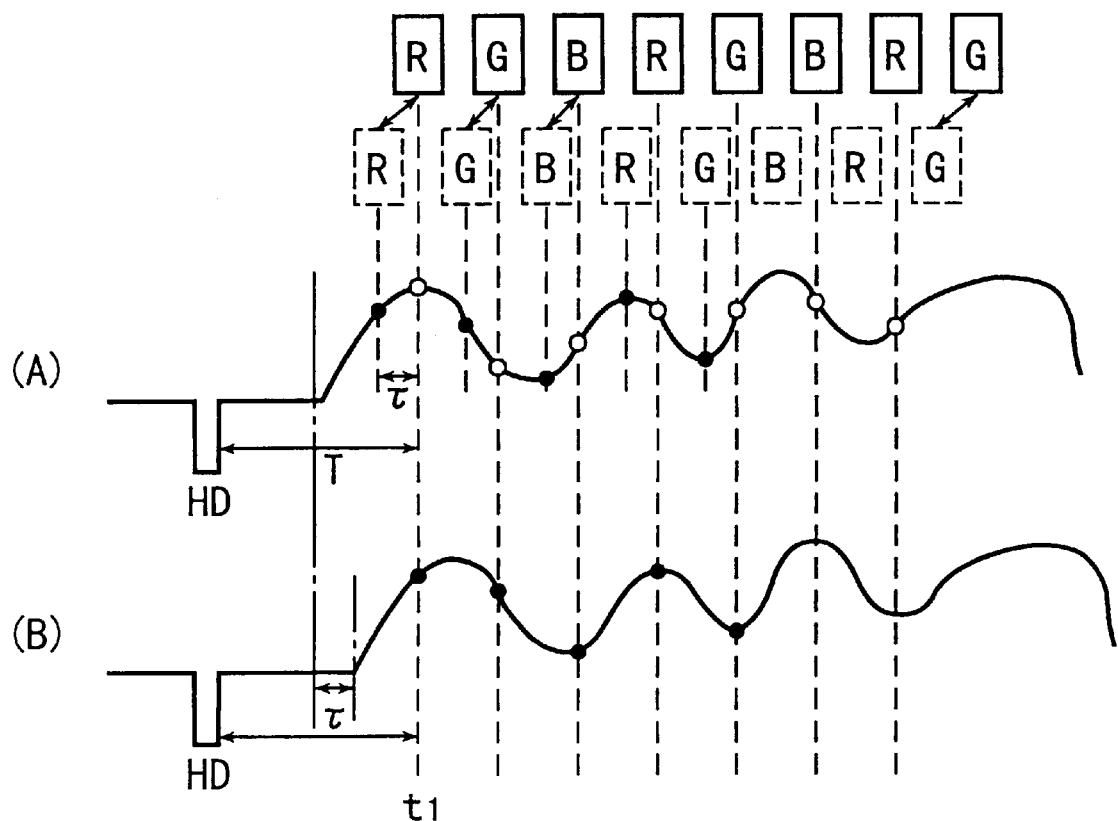
FIG. 17 shows signal waveforms for explaining a fifth embodiment.

A fifth embodiment will now be described. FIG. 17 shows an array of pixels to be displayed by LCD and timing of video signals. In the array of pixels to be displayed, the pixel array indicated by solid lines represents a pixel pattern of an odd field and the pixel array indicated by broken lines represents a pixel pattern of an even field based on wobbling operation. Video signal (A) is the video signal of odd field and video signal (B) is the video signal of even field. It is supposed here that the two are identical signals except that they are shifted in timing from each other. In the odd field video signal (A), ○ portions are the positions of sampling during odd field period and ● portions represent the positions at which sampling should be taken during even field period due to wobbling operation. Accordingly, if sampling is to be started from the same sampling phase $t_1$ delayed by time T from horizontal synchronizing signal HD in odd field period and even field period, the video signal (B) of even field must be sampled of ● portion at its sampling phase $t_1$. It is thus necessary to delay the video signal by time corresponding to the shift amount due to wobbling operation.

In the present embodiment, thus, delay circuits 3-1, 3-2, 3-3 are provided as previously shown in FIG. 8 between the decoder 2 and the analog-to-digital converters 5-1, 5-2, 5-3 to form video signals of even field period delayed by the time corresponding to the shift amount of wobbling. Then, the video signals of odd field period without delay and the delayed video signals of even field period are switched by the analog switches 4-1, 4-2, 4-3 to be inputted into the analog-to-digital converters 5-1, 5-2, 5-3.

Figure 18:
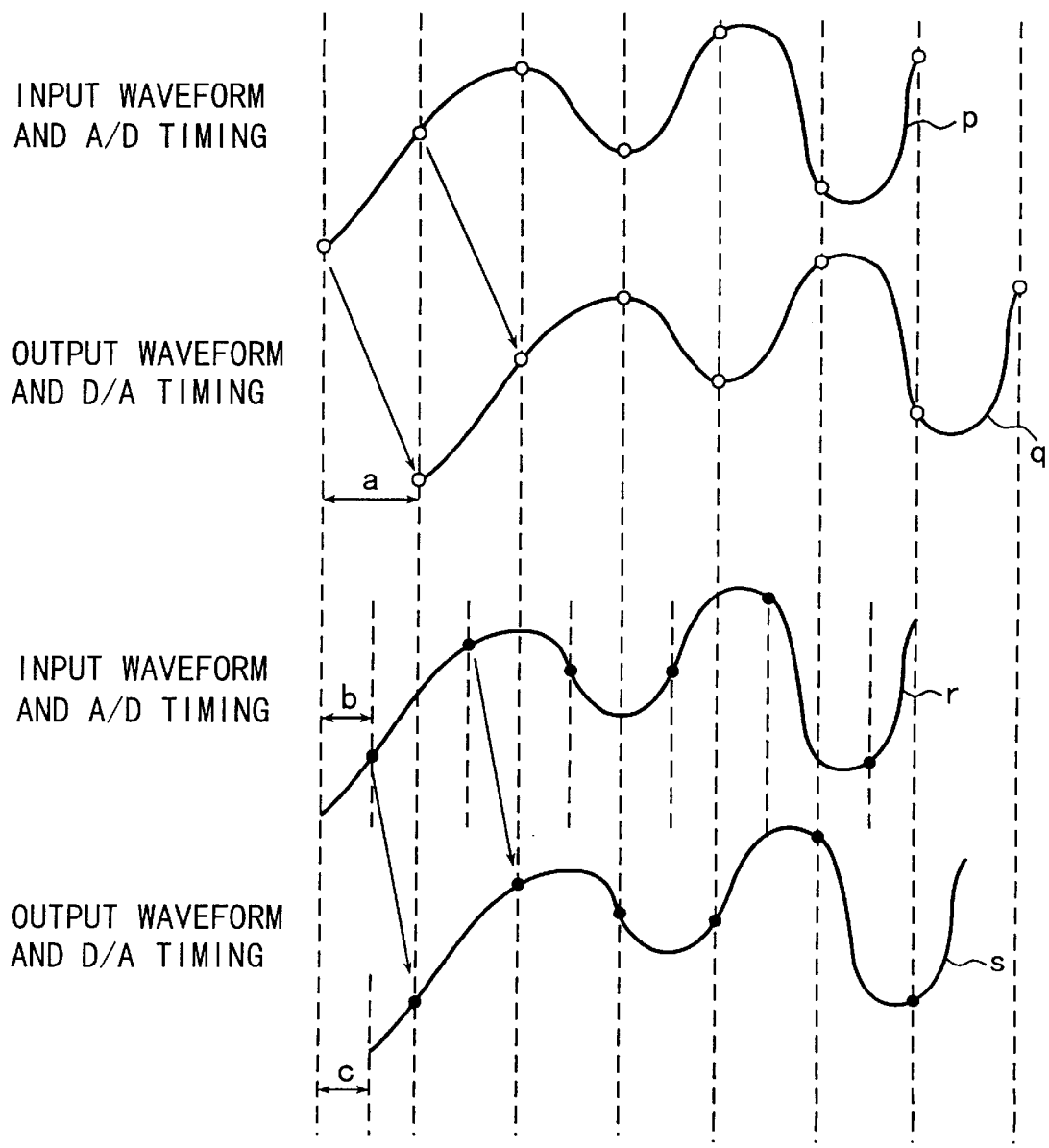
FIG. 18 shows signal waveforms for explaining a sixth embodiment.

A description will now be given with respect to a sixth embodiment which is related to forming of video signal of even field delayed from video signal of odd field. Curve "p" in FIG. 18 is an input waveform before analog-to-digital conversion of a video signal of even field, where the timing of sampling at the analog-to-digital conversion is indicated by ○. Curve "q" is an output waveform after digital-to-analog conversion of video signal also of even field, where the timing of sampling at the digital-to-analog conversion is indicated by ○. The timing of sampling at the digital-to-analog conversion is delayed by one clock (indicated by "a" in FIG. 18) from the timing of sampling at the analog-to-digital conversion.

On the other hand, curve "r" represents an input waveform before analog-to-digital conversion of an odd field video signal and is supposed here as identical as the input signal before analog-to-digital conversion of the even field video signal indicated by curve "p". Further, curve "s" is an output waveform after digital-to-analog conversion of the odd field video signal. Of the video signal "r" of odd field, sampling at the time of analog-to-digital conversion is taken as indicated by ● with a delay of time "b" from the timing of sampling at the time of analog-to-digital conversion of the video signal "p" of even field.

In this manner, the signal value of video signal at the timing of sampling delayed by time "b" at the analog-todigital conversion appears earlier at the time of digital-to-analog conversion. That is, delay time "c" of the output waveform at digital-to-analog conversion becomes (a-b) and is shorter than the delay time "a" (one clock) of the output waveform at digital-to-analog conversion of even field. In other words, video signal of even field can be delayed by shift in timing of sampling at analog-to-digital conversion.

Figure 19:
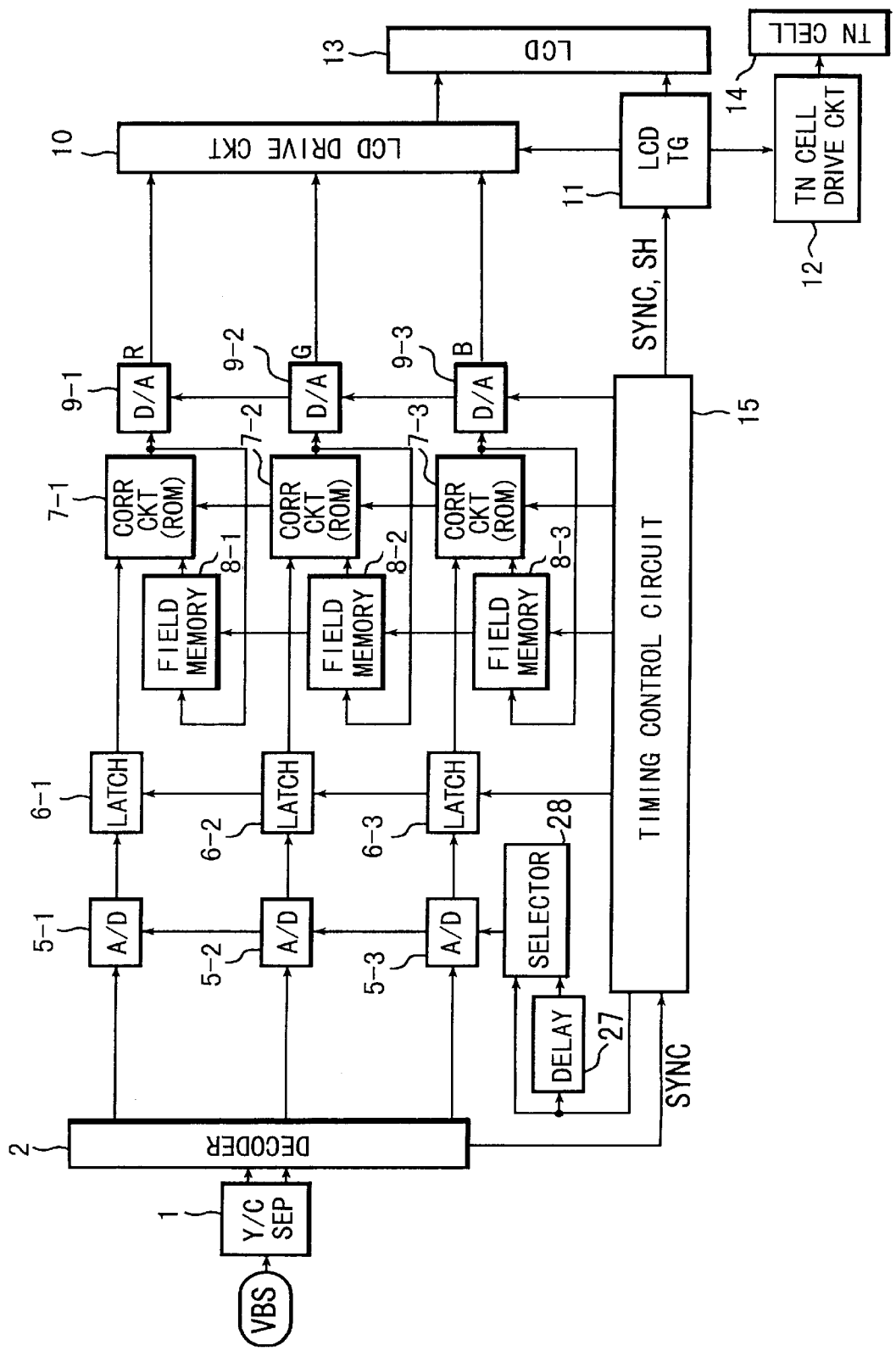
FIG. 19 is a block diagram showing the sixth embodiment.

To carry out such operation, a delay circuit 27 and a selector 28 are provided as shown in FIG. 19 such that timing pulse from the timing control circuit 15 is switched by the selector 28 between that which has been put through and that without passing through the delay circuit 27 and is inputted into the analog-to-digital converters 5-1, 5-2, 5-3, so as to control the timing of sampling at the analog-to-digital converters 5-1, 5-2, 5-3.

As has been described by way of the above embodiments, in accordance with the first aspect of the invention, an image display apparatus designed to display a high resolution image by effecting shifting of pixels based on optical wobbling operation can be achieved as the image display apparatus in which it is possible to reduce degradation of resolution due to response characteristics of at least one of the image display device and the optical axis wobbling means. In accordance with the second aspect of the invention, even when response characteristics greatly differ depending on the direction of wobbling of the optical axis wobbling means, it is possible to generate an accurate correction video signal corresponding thereto. In accordance with the third aspect of the invention, a correction video signal can be readily obtained by using the video signals of the current field and the preceding field.

In accordance with the fourth aspect of the invention, computation can be accurately carried out of the quantity of leakage light or the like due to response characteristics of the optical axis wobbling means during the preceding field so that an accurate correction video signal can be generated. In accordance with the fifth aspect of the invention, it is possible to reduce memory capacity and a lower price can be achieved by making smaller the number of quantization levels of video signals of the preceding field or the plurality of past fields to be stored to the memory than the number of quantization levels of input video signal. In accordance with the sixth aspect of the invention, the video signal correction means can be constructed by using a line memory instead of a field memory so that a further reduction in price can be achieved. In accordance with the seventh aspect of the invention, the deglitch processing and interpolation filter that are generally necessary at a digital-to-analog conversion section become unnecessary so that a lower price can be achieved. In accordance with the eighth aspect of the invention, the correction video signals of respective colors can be generated by a single video signal correction means so that a lower price can be achieved. In accordance with the ninth aspect of the invention, a delayed video signal of which the amount of delay is strictly set can be generated without a delay device and analog switch and, in the case of color video signals, it is readily possible to obtain delayed video signals without variance in the amount of the delay from one color signal to another.

What is claimed is:

1. An image display apparatus adapted to improve resolution, comprising:

an image display device having a display section methodically arraying a plurality of pixels, optical axis wobbling means for wobbling in predetermined directions the optical axis of light emitted from the display section of said image display device in accordance with input of video signals; and image display control means for causing said image display device to display different images in synchronization with the wobbling of the optical axis by the optical axis wobbling means; said image display apparatus further comprising:

video signal correction means for correcting said input video signals to mitigate degradation in resolution due to response performance of at least one of said image display device and said optical axis wobbling means.

2. The image display apparatus according to claim 1, wherein said video signal correction means adjusts correction amount corresponding to the wobbling directions of optical axis by said optical axis wobbling means.

3. The image display apparatus according to claim 1, wherein said video signal correction means performs correction by using video signal of the current field and video signal of the preceding field.

4. The image display apparatus according to claim 1, wherein said video signal correction means performs correction by using video signal of the current field and video signals of a plurality of past fields.

5. The image display apparatus according to claim 3, wherein said video signal correction means includes a memory for storing video signal of said preceding field, the number of quantization levels of video signal of the preceding field to be stored to the memory being set smaller than the number of quantization levels of said input video signals.

6. The image display apparatus according to claim 4, wherein said video signal correction means includes a memory for storing video signals of said plurality of past fields, the number of quantization levels of video signals of the plurality of past fields to be stored to the memory being set smaller than the number of quantization levels of said input video signals.

7. The image display apparatus according to claim 1, wherein said video signal correction means performs correction by using video signal of the current field and an interpolation data between the lines of the current field.

8. The image display apparatus according to claim 1, further comprising a driver circuit for said image display device, correction processing being performed by matching the timing of sampling at said video signal correction means and the timing of sampling at the driver circuit for said image display device.

9. The image display apparatus according to claim 1, wherein said video signals are color video signals, said video signal correction means commonly corresponding to respective color signals to sequentially correct the respective color signals.

10. The image display apparatus according to claim 1, further comprising analog-to-digital conversion means and digital-to-analog conversion means at stages before and after said video signal correction means, delay of video signal corresponding to the width of wobbling by said optical axis wobbling means being generated by a difference in sampling timing at the analog-to-digital conversion means and at the digital-to-analog conversion means.

* * * * *